(12) United States Patent
Carrott et al.

(10) Patent No.: US 11,522,719 B2
(45) Date of Patent: *Dec. 6, 2022

(54) SYSTEMS FOR PRODUCING AND MAINTAINING VERIFIED ELECTRONIC SIGNATURES

(71) Applicants: Richard F. Carrott, Tallahassee, FL (US); Phillip S. Carrott, Tallahassee, FL (US)

(72) Inventors: Richard F. Carrott, Tallahassee, FL (US); Phillip S. Carrott, Tallahassee, FL (US)

(*) Notice: Subject to any disclaimer, the term of this patent is extended or adjusted under 35 U.S.C. 154(b) by 59 days.

This patent is subject to a terminal disclaimer.

(21) Appl. No.: 17/335,129

(22) Filed: Jun. 1, 2021

(65) Prior Publication Data

US 2021/0288818 A1  Sep. 16, 2021

Related U.S. Application Data

(63) Continuation of application No. 16/275,683, filed on Feb. 14, 2019, now Pat. No. 11,050,571.

(51) Int. Cl.
*H04L 9/32* (2006.01)
*G06F 21/64* (2013.01)
(Continued)

(52) U.S. Cl.
CPC .............. *H04L 9/3247* (2013.01); *G06F 8/61* (2013.01); *G06F 21/64* (2013.01); *H04L 9/0662* (2013.01);
(Continued)

(58) Field of Classification Search
CPC ....... H04L 9/3247; H04L 9/3228; H04L 9/14; H04L 63/102; H04L 63/0876;
(Continued)

(56) References Cited

U.S. PATENT DOCUMENTS 5,412,771 A ‡ 5/1995 Fenwick ............... G06F 40/109
345/468
5,892,900 A ‡ 4/1999 Ginter .................... G06Q 20/12
726/26
(Continued)

FOREIGN PATENT DOCUMENTS

WO            152212 A1    7/2001
WO      WO-152212 A1 ‡    7/2001
(Continued)

OTHER PUBLICATIONS

Dawn M. Turner, "Trust Service Providers According to eIDAS", Cryptomathic, 2016, pp. 1-9.‡

(Continued)

*Primary Examiner* — Michael R Vaughan
(74) *Attorney, Agent, or Firm* — Gibb IP Law Firm, LLC

(57) ABSTRACT

Physically supplied user information is used to first verify the identity of a user before an app is supplied to a user device. Hardware identifiers of the user device are reviewed to determine whether to allow or deny use of the app on the user device. Once the app is approved, a user request is received by the app which is forwarded to the provider. The provider approves or disapproves of the request based, in part, on whether data in the request matches data maintained by the provider. Such approval/disapproval is provided from the provider to a party responsible for satisfying the user request. In addition, the provider generates a one-time-use electronic signature using data from a sequencer and data from the request, and the one-time-use electronic signature can be supplied to a signature repository and/or added to legal documents.

20 Claims, 6 Drawing Sheets

(51) Int. Cl.
*H04L 9/14* (2006.01)
*H04L 9/40* (2022.01)
*G06F 8/61* (2018.01)
*H04L 9/06* (2006.01)
*H04L 67/00* (2022.01)

(52) U.S. Cl.
CPC .............. *H04L 9/14* (2013.01); *H04L 9/3228* (2013.01); *H04L 63/0428* (2013.01); *H04L 63/0861* (2013.01); *H04L 63/0876* (2013.01); *H04L 63/102* (2013.01); *H04L 63/126* (2013.01); *H04L 67/34* (2013.01)

(58) Field of Classification Search
CPC ............. H04L 63/0861; H04L 63/0428; H04L 9/0662; H04L 67/34; H04L 63/126; H04L 63/0838; H04L 63/123; H04L 9/3234; G06F 21/64; G06F 8/61
See application file for complete search history.

(56) References Cited

U.S. PATENT DOCUMENTS

| | | | | |
|---|---|---|---|---|
| 5,903,721 A ‡ | 5/1999 | Sixtus | ..................... | H04L 29/06 726/2 |
| 6,000,832 A ‡ | 12/1999 | Franklin | ................ | G06Q 20/02 235/379 |
| 6,078,902 A ‡ | 6/2000 | Schenkler | .......... | G06Q 20/0855 235/380 |
| 6,512,840 B1 ‡ | 1/2003 | Tognazzini | ............... | G07F 7/10 382/119 |
| 6,618,705 B1 ‡ | 9/2003 | Wang | ..................... | G06Q 20/02 705/26.44 |
| 6,839,692 B2 ‡ | 1/2005 | Carrott | ................... | G06Q 20/10 705/64 |
| 6,947,908 B1 ‡ | 9/2005 | Slater | ..................... | G06Q 20/04 705/50 |
| 7,140,036 B2 ‡ | 11/2006 | Bhagavatula | ......... | G06F 21/445 726/2 |
| 7,386,516 B2 ‡ | 6/2008 | Turgeon | ............... | G06Q 20/027 705/64 |
| 8,260,719 B2 ‡ | 9/2012 | Carrott | ................... | G06Q 20/40 705/64 |
| 9,558,493 B2 ‡ | 1/2017 | Carrott | ............... | G06Q 20/3829 |
| 2002/0143637 A1 ‡ | 10/2002 | Shmueli | .................. | G06F 21/34 705/26.8 |
| 2003/0028481 A1 ‡ | 2/2003 | Flitcroft | ................. | G07F 19/00 705/39 |
| 2003/0200162 A1 ‡ | 10/2003 | Challener | .............. | G06Q 20/02 705/35 |
| 2004/0199469 A1 ‡ | 10/2004 | Barillova | ............... | G06Q 20/04 705/44 |
| 2006/0235703 A1 ‡ | 10/2006 | Wendenburg | ......... | H04L 9/3263 713/176 |
| 2008/0095360 A1 ‡ | 4/2008 | Vuillaume | ............ | H04L 9/3236 380/44 |
| 2008/0222046 A1 ‡ | 9/2008 | McIsaac | ................ | G06Q 20/12 705/64 |
| 2009/0158029 A1 ‡ | 6/2009 | Wheeler | ............... | H04L 63/062 713/155 |
| 2011/0099388 A1 ‡ | 4/2011 | Hett | ...................... | H04L 9/3297 713/193 |
| 2011/0231666 A1 ‡ | 9/2011 | Guenther | ................ | G06F 21/32 713/186 |
| 2011/0276495 A1 ‡ | 11/2011 | Varadarajan | ......... | G06Q 20/382 705/71 |
| 2012/0011066 A1 ‡ | 1/2012 | Telle | ..................... | G06Q 20/425 705/44 |
| 2012/0314090 A1 ‡ | 12/2012 | Jallow | .................. | G06K 7/1095 348/207.1 |
| 2012/0324233 A1 ‡ | 12/2012 | Nguyen | ................ | H04L 9/3268 713/179 |
| 2015/0379305 A1 ‡ | 12/2015 | Cece | ........................ | G07C 9/35 726/30 |
| 2016/0344728 A1 ‡ | 11/2016 | Jeon | ..................... | H04L 63/0838 |
| 2018/0048474 A1 ‡ | 2/2018 | Landrock | ................ | G06F 21/44 |
| 2020/0258176 A1 * | 8/2020 | Gibson | ................ | G06Q 10/083 |

FOREIGN PATENT DOCUMENTS

| | | | | |
|---|---|---|---|---|
| WO | 03063055 A2 | 7/2003 | | |
| WO | WO-03063055 A2 ‡ | 7/2003 | ............. | G07C 13/00 |
| WO | WO-2017149453 A1 * | 9/2017 | ........... | G06F 21/602 |

OTHER PUBLICATIONS

Dawn M. Tuner, "Qualified Electronic Signatures for eIDAS", Cryptomathic, 2016, pp. 1-11.‡

U.S. Appl. No. 16/275,683, Notice of Allowance dated Mar. 8, 2021, pp. 1-15.

\* cited by examiner
‡ imported from a related application

SYSTEMS FOR PRODUCING AND MAINTAINING VERIFIED ELECTRONIC SIGNATURES

BACKGROUND

Field of the Invention

Systems and methods herein generally relate to technologies of electronic signatures (e-signatures), and more particularly to systems for producing and maintaining verified electronic signatures.

Description of Related Art

In many cultures throughout history a person's signature on a document was a unique self-identification of the person's consent to the terms within the signed document. As modern transactions continually move away from handwriting and toward electronic communications, the ability to obtain an electronic version of the traditionally handwritten signature becomes elusive.

Governments have attempted to emulate the handwritten signature by enacting specific regulations implementing electronic signature protocols (e.g., electronic Identification Authentication and trust Services (eIDAS) in the EU; National Institute of Standards and Technology-Digital Signature Standard (NIST-DSS) in the US; Zert Electronic Signature (ZertES) in Switzerland, etc.) which, if followed, legally bind the one creating the electronic signature.

Electronic signatures have a vast breadth of security levels, from low-security simple images of a handwritten signature to highly secure qualified electronic signature that utilizes a digital certificate encryption and a security signature-creating device. However, because of complexities associated with increasing security levels, and because many forms of electronic signatures have insufficient security, electronic signatures have met with limited success.

SUMMARY

Methods herein begin by a provider having previously (or by the provider currently) performing a process of verifying physically supplied user information of a user to verify the identity of the user. In one example, this can involve a human agent of the provider obtaining a government issued identification and a signature from the user when the agent of the provider physically meets with the user.

At some point in the process, the provider obtains what is referred to herein as "initially obtained hardware identifiers" of a device (or multiple devices) supplied by the user to the provider. For example, the human representative (when physically or virtually meeting with the user) can connect a computerized device to the user-supplied device which reads various hardware identifiers from the device including serial numbers, manufacturer's and/or brand names, model numbers, device types, device characteristics, etc., from different hardware components such as hard drive(s), processor(s), screen(s), speaker(s), battery(ies), etc., and different software components including operating system version numbers, software present, on the device, etc. Alternatively, such initially obtained hardware identifiers can be obtained when a provider app is being installed on the user device.

In some scenarios, the provider evaluates the initially obtained hardware identifiers to approve or disapprove the device(s). This evaluation can include a determination as to whether the provider's application will properly operate on the device, whether there are any unacceptable viruses on the device, etc. Further, the evaluation can look at the combination of hardware components within the device to determine if the device is genuine (for example, using industry-supplied serial number ranges for hardware that was known to be used together in valid devices).

The provider physically supplies the provider's application to the device (only after verifying the identity of the user and potentially approving the device). This can be accomplished in a number of ways. For example, if the provider's equipment previously obtained the initially obtained hardware identifiers, such equipment can supply the provider's application (while still physically connected to the device), the human representative of the provider can supply some piece of media (e.g., disk, memory stick, etc.) to the user to allow the user to transfer the provider's application to the device, the provider application can be downloaded to the user device, etc. One feature of methods and systems herein is that the distribution of the provider's application is physically restricted to identified users supplying approved devices.

Once the provider's application is operating on the device, the application obtains what is referred to herein as "read hardware identifiers" of the device by reading the same data of the device listed above. Further, the provider's application obtains what is referred to herein as "entered user information" by asking the user to respond to questions through a user interface of the device. The provider application encrypts and stores the read hardware identifiers and the entered user information as encrypted data in electronic memory of the device, and then transmits the encrypted data to the provider through a computer network.

Additionally, each version of the provider's application supplied to different devices or users can be unique to each device by having a unique app identifier, app serial number, time/date stamp, and/or each encryption key within each version of each application can be different, etc., so that each app version is unique to a specifically identified device.

The provider evaluates the encrypted data and allows or denies use of the application on the device. For example, the provider can decrypt the encrypted data using a key consistent with the encryption method used by the application. This allows the provider application to determine whether the read hardware identifiers in the decrypted data match the initially obtained hardware identifiers, determine whether the entered user information in the decrypted data matches the physically supplied user information, etc. Synchronized sequencers can be used by the application in some embodiments herein, and therefore, if use of the application on the device is allowed by the provider, the provider and the application can synchronize their individual sequencers for identified users and approved devices.

At this point the provider's application is set up on the device of the user and the user can proceed to use the application to satisfy requests that require a signature, such as to pay for items, gain access to restricted areas or assets, sign legal documents, etc. When using the application, the user supplies a user request to the application through the user interface of the device (after use of the application on the device is allowed by the provider).

In response to the user request, the application generates a modified request containing some or all of the data from the user request, data from the optional application sequencer (of the previously mentioned synchronized sequencers, if used), and portions or all of the encrypted data stored on the device. If the sequencers are used, the provider and the application sequencer increment at the same increment for each different user request to allow each modified request to be unique.

The application forwards the modified request to the provider through the computer network. The provider approves or disapproves the user request, based in part on whether data in the modified request matches a provider sequencer of the sequencers (if synchronized sequencers are used), whether the initially obtained hardware identifiers and read hardware identifiers in the modified request match, and/or whether the physically supplied user information and the entered user information in the modified request matches, etc. The provider supplies this approval or disapproval through the network to a party responsible for satisfying the user request. For example, the provider can inform a payment division or entity to make payment, can inform an access control entity to grant access, etc.

In addition, the provider generates a one-time-use electronic signature using some or all of the data from the modified request upon the approval of the modified request. Regardless of whether synchronized sequencers are used, the provider can use a sequencer and increments the sequencer for each one-time-use signature to ensure each one-time-use electronic signature is unique.

The provider also supplies the one-time-use electronic signature to a signature repository through the computer network. Thus, the provider can store the one-time-use electronic signature for a financial institution or can supply/store the one-time-use electronic signature to/for a merchant to allow the merchant to retain proof of signature, etc. In other alternatives, the provider can add the one-time-use electronic signature to legal documents that have been requested to be signed in the user request; and this allows the provider to supply the signed legal documents (containing the one-time-use electronic signature) to a party requesting the signed legal documents in the user request.

Systems herein include (among other components) a provider device and a provider computerized system that is operatively connected to the provider device through a computerized network. The provider device can include a physical attachment for connecting to a user device. When connected to the user device through the physical attachment, the provider device is adapted to obtain what are referred to herein as "initially obtained" hardware identifiers of the user device; however, this connection is made only after the provider has verified the physically supplied user information of a user associated with the user device so as to verify the identity of the user.

The provider device can be adapted to transmit the initially obtained hardware identifiers to the provider computerized system through the computerized network to optionally allow the provider computerized system to approve the device before supplying the application to the device. If the provider device is connected to the user device through the physical attachment, the provider device is adapted to physically supply an application to the user device, after verification of the identity of the user and approval of the device. In other alternatives, the application can be supplied using a media device or the application can be downloaded from the provider. Additionally, during installation of the application on the device, the hardware identifiers of the device can be verified (if such was not done previously) and installation can be aborted if the device cannot be verified.

The application is adapted to (if, and when, operating on the device) obtain read hardware identifiers of the device, obtain entered user information through a user interface of the device, encrypt and store the read hardware identifiers and the entered user information as encrypted data in electronic memory of the device, and transmit the encrypted data to the provider computerized system through the computer network, etc. Each different application supplied to each different user device can contain a different encryption key that is used to encrypt the encrypted data.

Upon receipt, the provider computerized system is adapted to evaluate the encrypted data and allow or deny use of the application on the device. For example, the provider computerized system is adapted to evaluate the encrypted data by at least decrypting the encrypted data using a key consistent with an encryption methodology used by the application, determining whether the read hardware identifiers in the decrypted data match the initially obtained hardware identifiers, and determining whether the entered user information in the decrypted data matches the physically supplied user information.

After use of the application on the user device is allowed by the provider computerized system, the application is adapted to receive a user request from the user through the user interface of the user device. The application is further adapted to generate a modified request containing data from the user request and the encrypted data and forward the modified request to the provider computerized system through the computer network. The provider computerized system is adapted to approve or disapprove the user request, based in part on whether data in the modified request matches the initially obtained hardware identifiers and the physically supplied user information, and supply such approval or disapproval of the user request through the computer network to a party responsible for satisfying the user request.

Additionally, the provider computerized system is adapted to generate a one-time-use electronic signature using data from a sequencer and data from the modified request, upon the approval of the modified request. In some implementations, the provider computerized system and the application are adapted to sequence separate sequencers at the same increment for each different user request. Further, the provider computerized system is adapted to supply the one-time-use electronic signature to a signature repository through the computer network. In one example, the provider computerized system is adapted to add the one-time-use electronic signature to legal documents requested to be signed by the user request and supply the legal documents containing the one-time-use electronic signature to a party identified to receive the legal documents in the user request.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
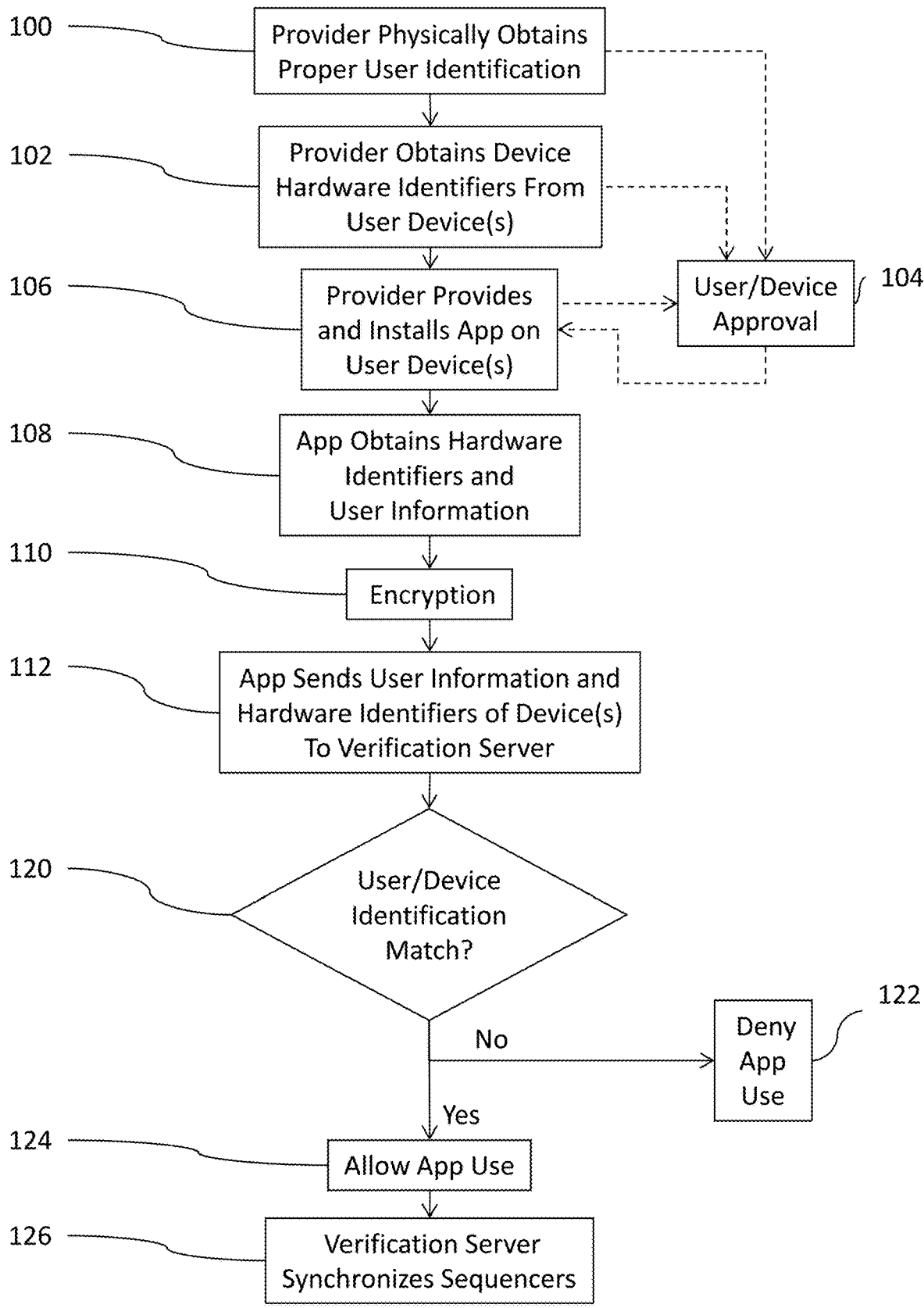
FIGS. 1 and 2 are flow diagrams of various methods herein.

As mentioned above, electronic signatures have a vast breadth of security levels, from low-security simple images of a handwritten signature to highly secure qualified electronic signatures; and such have met with only limited success because of increasing complexities associated with increasing security levels.

Electronic signatures can provide solutions to industries that are required to identify individuals. For example, according to provisions of the USA Patriot Act (Public law 107-56, Statutes at Large 115 Stat. 272 (2001)), all Financial Institutions ("FI") must verify the identity of individuals wishing to conduct financial transactions. Section 326 of the USA Patriot Act requires financial institutions to develop a Customer Identification Program (CIP) appropriate to the size and type of its business. Each financial institution must incorporate a CIP into their Bank Secrecy Act/Anti-money laundering compliance program.

For purposes of these regulations, a "financial institution" is not restricted only to depository institutions, such as banks and credit unions, but also includes any business that handles a "Covered Account." This can include retail stores, any business that transfers funds or sells money orders, any business that issues credit, and any businesses that handle financial accounts, such as stock brokers and security dealers.

According to various analytic groups, the act of creating a fake identity to access goods or services has become a top-order threat for many American financial institutions. Research suggests that synthetic identity fraud losses make up to twenty to thirty percent of all credit write-offs. This equates to between six and nine billion dollars annually. More, synthetic identity fraud is difficult to distinguish from legitimate consumer activity. Without a specific victim to confirm a crime, this type of fraud carries a low-risk, high-reward proposition for criminals that often sits unidentified in a lender's credit losses.

This "Covered Account" requirement broadens the field of institutions and activities covered under these regulations. This could make it inappropriate for cyber-transactions to even be allowed given that, in general terms, the parties to a cyber-transaction, or cyber-payment cannot be verified within the context of such a "transaction." Rather, such an activity can be more properly labeled an "unverified commercial risk," with legal notice that each party is aware of the risk and each party agrees to bare its risk, unless the parties agree to wave the risks.

To address such issues, methods and system herein begin with the bank/provider physically obtaining proper user identification. With these systems/methods, each time the user withdraws funds or deposits funds, their account is updated, as with any typical account. Then, bank customer requests affecting account activity (deposit, withdrawal, etc.) result in a user "token" from the bank reflecting the customer's "need;" i.e., dollars or other currency, etc. amount. The bank verifies the customer's (prior) "signature" from the bank's historic customer records, triggering the bank's creation of an e-signature which is the customer's current "signature."

The form and substance of the "customer signature" is a product of a methodology that uses data from the customer's accounts, personal information, activity date/time, transaction account information, etc. The "customer signature" is an item created by the bank (or other institution) that both verifies the customer's account activity and the customers agreement to that activity. Each "customer signature" is unique (they are encoded data of the customer and customer information account, etc.), which permits customers and the bank/provider to maintain various accounts for various needs (commercial, personal, retail, etc.) and allows the bank to simplify the bank's activity with respect to each account's activity. The customer signature is also unique in that it allows a multitude of "signatures" related to a single customer/account, or a multitude of accounts for the same customer with special account needs (with each account being maintained separately, as needed: e.g. business; household; etc.).

With respect to the formation of the customer signature, the customer's e-signature is generated by the financial institution using a methodology that encodes elements of customer's information, transaction information, time and date, transaction payment amount, and the customer's agreement to the binding use of the e-signature. With methods and systems herein, counter party signatures may be sent to others, such as another party's bank, or to a participating merchant's bank. The customer's bank stores the customer signature record to the customer's account. Further, the customer may opt out of a VST (verified signature transaction) prior to any transaction, but not after the transaction has been finalized. Additionally, the user's information may be encrypted.

Therefore, this disclosure describes improvements to technologies that produce electronic signatures, which increase the acceptance and ease of use of electronic signatures by altering conventional electronic signatures systems to permit existing user identification verification architectures to be incorporated, and thereby bring the convenience of traditional handwritten signatures to the world of electronic signatures.

To produce electronic signatures with higher-level sophistication and higher security conventional electronic signature systems, a signatory must first interact with a number of different entities and follow many burdensome initialization procedures; however, such initial processes create barriers to the use of electronic signatures. Digital signatures (which demonstrate that an item has not been altered since creation) are often used to implement higher-security electronic signatures; however, digital signature technology requires the creator and recipient to use a common system, which increases the complication of such systems, and in turn increases the barriers to use of electronic signatures.

Some electronic signatures require the signatory to obtain a non-changing digital certificate that is only issued after thorough verification of the signer's identity by a trusted third party. Digital certificates are intended to be unique to the individual and difficult to copy, making the signatory the sole holder of a private key that is used to create the electronic signature. However, individuals often do not properly follow procedures for maintaining such digital certificates, which can result in improper disclosure of their private key. Anyone obtaining another's digital certificate can create unauthorized electronic signatures, impacting the legitimacy of such electronic signature systems, which decreases public confidence in such system, and further discourages their use.

In view of such issues, systems and methods herein utilize existing historical identification verifications maintained by providers to reduce barriers that discourage the use of electronic signatures. Additionally, the systems and methods herein restrict the ability to create electronic signatures to providers such as banks or other financial institutions (systems herein do not allow individual users to create e-signatures as conventional systems do), which avoids issues stemming from individuals not properly following procedures for securely maintaining items such digital certificates. By doing so, the systems and methods herein reduce the likelihood that e-signatures are counterfeit and this increases the confidence levels of those relying upon the validity of the electronic signatures (because such are produced only by more sophisticated institutions and not by inconsistently acting individuals). Further, the methods and systems herein can use sequencers with data from the user request to make each electronic signature unique from all other electronic signatures (one-time-use electronic signatures) which dramatically reduces the likelihood that such e-signatures are imitations, which increases security and user confidence levels.

More specifically, the methods and system herein allow the use of existing previous physical identity verifications for electronic signatures instead of imposing a requirement to engage a third party verification service (that, again, can be a barrier to electronic signatures). For example, financial institutions have traditionally maintained physical signature cards for holders of accounts. The methods and systems herein can use such historically maintained signature cards to verify the identity of signatories, without requiring newly obtained signatures, avoiding the need for in-person meetings between provider agents and customers in some situations.

Further, the methods and systems herein include an app that is supplied to user devices only after the user's identity has been verified. Various hardware identifiers of the user devices are maintained by the provider. When a user makes a request that requires a signature through the provider's app, the provider uses their stored hardware identifiers of the user device, and other information stored about the app, to verify that the app and user device are valid. If the app and user device are valid, the provider (not the app or user) generates the electronic signature, which avoids issues stemming from individuals not properly following procedures for securely maintaining items (e.g., digital certificate) needed to generate electronic signatures, which again increase the confidence levels of those relying upon the validity of the electronic signatures produced by methods and systems herein.

Additionally, with such methods and systems the provider (not the app or user) stores the electronic signature for, and/or transmits the electronic signature to, the party requiring the signature, which avoids errors individuals may encounter when handling electronic signatures, which can inadvertently alter and invalidate such signatures.

In other words, there are a number of barriers that reduce the popularity of electronic signatures that the methods and systems herein address. Such methods and systems permit historic identity verifications to be utilized, which reduces the number of personal meetings between institutions and their customers, saving both parties time and effort. Such methods and systems restrict access to the provider's app to previously identified users and their devices, and verify each request made through the provider's app independently of the user device to validate the request; and, once a request is known to be valid, the provider generates and processes the electronic signature, relieving the user of such details and increasing the recipients confidence that the electronic signature is genuine (because it has been generated by the provider and not an individual).

Stated differently, conventional electronic signatures suffer from the problems of not being secure enough, reducing confidence in such electronic signatures, or if they do have strong security of being overly technically complex to create and use, which also decreases popularity of conventional electronic signatures. Such technological problems place barriers in the way of using electronic signatures by reducing confidence that the electronic signature is valid (caused by the problem of low security electronic signatures) or making it very difficult to create higher security electronic signatures (caused by the problem of over-complexity of higher security electronic signatures).

Methods and systems herein solve these problems by reducing the technical complexity of creating and using high-security electronic signatures. Specifically, the methods and systems herein reduce technological complexity by limiting user interaction to a simple request through an app, with the electronic signature being generated, processed, and stored by the provider (after verifying that the app and user device are valid). By changing the technology to create and process electronic signatures at the provider computerized system, and by providing technology in the provider app that limits the user to making requests through the app, the revised technology of the methods and systems disclosed herein simplifies the creation of the electronic signature for the user (reducing barriers to electronic signature creation) yet still output a high-security electronic signature (reducing barriers to acceptance of electronic signatures).

FIG. 1 is a flowchart illustrating aspects of exemplary methods herein. In item 100, these methods verify the identity of a user by physically verifying (physically supplied) user information. For example, this verification is, or was previously, performed by a human representative of a provider obtaining a government issued identification and a signature from the user when physically meeting with the user. For example, a bank employee can check (or have previously checked) the driver's license, passport, etc., of a new or existing customer and have the customer provide an authorized signature (or such could have been done historically and maintained by the bank in a repository of physical signature cards). In other alternatives a video conference with a human agent of the provider, or other virtual interface with the user (potentially with an avatar (computer generated) agent of the provider) can be used to obtain the physically supplied user information to verify the identity of the user.

Either at the same time that the users identify is verified or at a later time, in item 102 the provider obtains what is referred to herein as "initially obtained" hardware identifiers of a user device (or multiple devices) that is supplied by the user to the provider. For example, in one option in item 102, the human representative (when physically or virtually meeting with the user) can physically connect a computerized provider device to the one or more user-supplied devices. In other examples, the provider can connect to the user device(s) remotely through a network connection to read the initially obtained hardware identifiers, or the initially obtained hardware identifiers can be obtained by the provider application during the installation of the provider's application on the user device, which occurs later (item 106) in the process flow shown in FIG. 1.

The various hardware identifiers referred to in this disclosure include identifiers of hardware components within the user device(s) including serial numbers, manufacturer's and/or brand names, model numbers, device types, device characteristics, etc., from different hardware components such as hard drive(s), processor(s), screen(s), speaker(s), battery(ies), etc., and different software components including operating system version numbers, software present, on the device, etc.

In item 104, potentially before the provider application is supplied to the user device, the provider can evaluate the initially obtained hardware identifiers to approve or disapprove the user device(s). This device approval evaluation 104 can include a determination as to whether the provider's software application (or app, for short) will properly operate on the device, whether there are any unacceptable viruses on the device, etc. Further, the evaluation can look at the combination of hardware components within the device to determine if the device is genuine as manufactured using, for example, industry-supplied serial number ranges, model number ranges, device characteristics, etc., for brand-specific component hardware, that was known to be used in valid devices as they were manufactured.

After verifying the identity of the user in item 100 (and potentially after approving the device in item 104) with these methods the provider physically supplies the provider's app to the device in item 106. The processing in item 106 can be accomplished in a number of ways. For example, if the provider's equipment was used to previously read the initially obtained hardware identifiers, that same provider equipment can supply the provider's app (while still physically connected to the device). In other alternatives, the provider's app can be supplied to the device in item 106 by the human representative of the provider supplying an electronic storage media device (e.g., disk, memory stick, etc.) to the user to allow the user to transfer the provider's app to the device, or the app can be remotely downloaded to the user device(s) through the network, etc. One feature of methods and systems herein is that the distribution of the provider's app in item 106 is physically restricted to users whose identity has been physically verified in item 100 and who have physically supplied approved devices in item 104.

Also, the provider application is installed on the user device in item 106 (such app installation is typically handled by an automated installation program which varies from platform to platform). During such installation, the initially obtained hardware identifiers can be obtained from the user device, if they have not been previously obtained in item 102. If the initially obtained hardware identifiers are obtained during installation by the provider application, the initially obtained hardware identifiers are transmitted by the provider application to the provider and the same processing shown in item 104 is performed so that the provider approves or disapproves the user device. If the device is approved, installation continues; however, if the device is disapproved, installation terminates, and the provider application can be automatically deleted from the user device. Therefore, again, distribution of the provider's app is physically restricted to users whose who have physically supplied approved devices.

Further, each version of the provider's app supplied to different devices or users in item 106 is unique to each device by having a unique app identifier, unique app serial number, unique time/date stamp, and/or each unique encryption key, etc., so that each app version is unique to a specifically identified device. In a simplified example, each app can have a unique serial number that is associated with a specific user device (which can be identified by owner name, brand, model number, serial number, etc.). Further, in item 106, the provider records which device received which app to associate a specific app with each different device to which the app was supplied.

After the provider's app has been installed on the device (the processing in item 106), as an additional safeguard the app obtains what is referred to herein as "read hardware identifiers" of the device in item 108 by independently reading the same hardware identifiers of the device discussed above in item 102 (including serial numbers, manufacturer's and/or brand names, model numbers, device types, device characteristics, etc., from different hardware components such as hard drive(s), processor(s), screen(s), speaker(s), battery(ies), etc., and different software components including operating system version numbers, software present, on the device, etc.). Further, in item 108, the provider's app obtains what is referred to herein as "entered user information" by asking the user to respond to questions through a user interface of the device to resupply the same data as the physically supplied user information obtained in item 100.

The provider app encrypts and stores the read hardware identifiers and the entered user information in item 110 as encrypted data in electronic memory of the device. The provider app then transmits the encrypted data to the provider (e.g., a verification server) through a computer network in item 112.

Continuing with this additional safeguard, to prevent inappropriate or unauthorized use of the app, in item 120, with these methods the provider evaluates the encrypted data and allows 124 or denies 122 use of the app on the device. For example, in item 120 the provider can decrypt the encrypted data using a key consistent with the encryption method and key used by the app to perform the encryption in item 110. Then, in the processing in item 120 the provider app determines whether the read hardware identifiers in the decrypted data match the initially obtained hardware identifiers, and determines whether the entered user information in the decrypted data matches the physically supplied user information, etc. This prevents inappropriate use of the provider app on a different user device, prevents inappropriate use of an altered provider app, etc.

Synchronized sequencers can be used by the app in some embodiments herein, and therefore, if use of the app on the device is allowed by the provider, in item 126, the provider and the app can synchronize their individual sequencers for identified users and approved devices. Therefore, the processing in FIG. 1 shows some steps used to load, install, and set up the provider's app on the user device(s).

Figure 2:
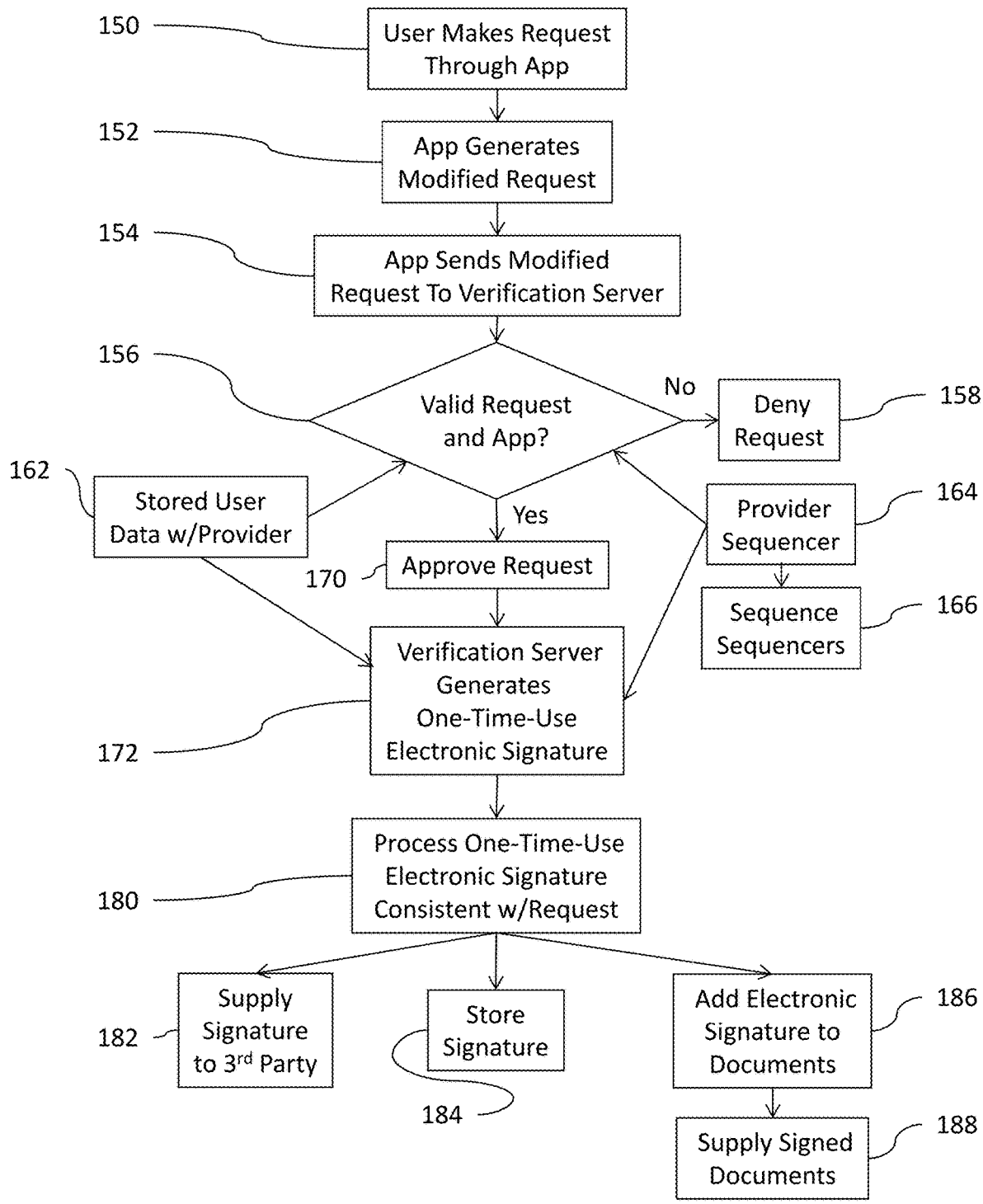

FIG. 2 illustrates some ways in which the provider's app is used by the user operating their device once installed and allowed. Therefore, FIG. 2 presumes that the steps in FIG. 1 have been completed and the provider's app is installed and set up on the device of the user (104/106) and the user can proceed to use the app (124) to satisfy requests that require a signature, such as to pay for items, gain access to restricted areas or assets, sign legal documents, etc.

When using the app, as shown in item 150, the user supplies a user request to the app through the user interface of the device. The user request can be any activity for which another entity might require a signature of the user. For example, the user request can be a request to withdraw funds from a financial institution, a request to pay a merchant for a good or service, a request for access to a restricted asset (such as information, a physical space, a virtual space), a request to execute a document, such as a legal document, etc.

In response to the user request, in item 152 the app generates a modified request containing some or all of the data from the user request, data from the optional app sequencer (of the previously mentioned synchronized sequencers, if used), and portions or all of the encrypted data stored on the device.

As shown in item 154, the app forwards the modified request to the provider through the computer network. Then, in item 156, the provider approves or disapproves the user request based on whether the user request is valid, and whether the request can be approved (e.g., whether there are sufficient funds in an account, whether the user has rights allowing approval, etc.) and based on whether the app is a valid app.

The determination of whether the app is a valid app in item 156 is based on considerations such as: whether app sequencer data in the modified request (152) matches a provider sequencer 164 of the sequencers (if synchronized sequencers are used); whether read hardware identifiers in the modified request (152) match the initially obtained hardware identifiers maintained by the provider (stored user data maintained by the provider shown as item 162 in FIG. 2); whether entered user information in the modified request (152) matches the physically supplied user information maintained by the provider 162, etc. In other words, if the synchronized sequencers are used, data from the provider sequencer 164 can be matched to a corresponding app sequencer (which were initially synchronized in item 126 in FIG. 1, as discussed above) to determine whether to approve or deny the user request in item 156.

The provider supplies the approval 170 or denial 158 of the user request (150) based on whether the modified request (152) matches the data maintained by the provider (in items 162 and 164). The approval 170 or denial 158 of the user request is supplied through the network to a party responsible for satisfying the user request (e.g., a financial institution, a party controlling access to an asset, etc.). For example, the provider can inform a payment division or entity to make payment, can inform an access control entity to grant access, can inform an entity that signed documents are forthcoming, etc.

In addition to the approval (170) as shown in item 172, in methods herein the provider generates a one-time-use electronic signature upon the approval of the modified request using some or all of the data from the modified request 152, data from the provider sequencer 164, and/or stored user data maintained by the provider 162. The one-time-use electronic signature (from item 172) is, in one example, a series of alpha-numeric digits (e.g., a digital code or encryption data stream) produced by a methodology that combines some or all of the physically supplied user information maintained by the provider 162, some or all of the data from the user request (obtained in item 150), some or all of the data (e.g., digits, etc.) output by the sequencer 164, etc. For example, some or all of such data can be applied to a cipher using a key (e.g., shared key, public/private keys in asymmetric cryptography, etc.) to encrypt such data into a digital result that is the one-time-use electronic signature (in item 172). Additionally, as noted above, digital certificates can be used to establish digital signatures that are useful in determining if the document and/or electronic signature have been altered.

The length and amount of data contained within the one-time-use electronic signature can vary depending upon the transaction type. For example, if the one-time-use electronic signature is for a bank withdrawal and the one-time-use electronic signature will only be maintained by the bank, a small amount of information can be encoded in the one-time-use electronic signature, such as account number, time stamp, withdrawal amount, customer name, etc. In contrast, if the one-time-use electronic signature documents customer assent to a transaction with a third party, in addition to the foregoing data, the one-time-use electronic signature can encode the third party's name, location, account number, etc. Further, for more significant transactions, even more data can be encoded in the one-time-use electronic signature, such as: a legal description of real estate being purchased, a description of all (or at least significant) contractual terms, a description of specifics of the item being purchased (e.g., model number/name, serial number, color, size, etc.).

Regardless of whether an app synchronized sequencer is used by the app, the provider can use a provider sequencer when creating the one-time-use electronic signature and increment the sequencer(s) for each one-time-use signature to ensure each one-time-use electronic signature is based on different data output from the sequencers and is therefore unique. In order to keep the app sequencer and the provider sequencer synchronized, in item 166 in FIG. 2, both sequencers are sequenced at the same increment each time a different user request is evaluated in item 156 or a one-time-use electronic signature is generated in item 172, to allow each modified request to be unique from all other modified requests.

By basing the one-time-use electronic signature (from item 172) on sources (from items 150, 152, 162, 164, etc.) that contain dynamic data, each one-time-use electronic signature is unique from all other one-time-use electronic signatures, even if the same method (e.g., same cipher and key) is used to combine the data into the one-time-use electronic signature. In other words, because each user request is different (different merchant/asset, different time/day stamp, different physical location, different financial amount, etc.) and because the sequencers always produce incremented data relative to previously generated data, each one-time-use electronic signature will be unique relative to all other one-time-use electronic signatures.

Another feature that reduces the likelihood of nefarious duplication of such one-time-use electronic signatures is that methods and systems herein limit part of the data used to create legitimate one-time-use electronic signatures to data that is only known by the financial institution. Therefore, the one-time-use electronic signatures are calculated using two-part data, one part of which is only maintained by the financial institution and one part of which is associated with the user request. For example, one number of such two-part data can be a transaction amount (a withdrawal amount, a purchase amount, a deposit amount, etc.), which is part of the user request, and another number of such two-part data can be post-transaction user account balance, such as an ending balance of a user's account after deposit (such as a savings or checking account balance after a withdrawal), a remaining credit limit amount after a credit charge, a loan balance remaining after a payment, etc.

By using two-part data to create the alphanumeric code of the one-time-use electronic signature, the systems and methods herein prevent a party having one part of the data from making a counterfeit one-time-use electronic signature. Thus, if a merchant has a purchase amount, if a payment facilitator has a payment amount, etc.; such parties will not know a user's account balance amount immediately before the transaction, and will therefore not be able to calculate a post-transaction balance. Indeed, even users themselves may not possess such information because, while users may know their ending monthly balances, the presence of interest charges/accruals, other user transactions, periodic financial institution charges, etc., even a user may not be certain of the exact minute-by-minute balance with a financial intuition. This makes the one-time-use electronic signatures produced by methods and systems herein very difficult or impossible to counterfeit, which further reinforces that such one-time-use electronic signatures (created and maintained by financial institutions who use these methods and systems) are legitimate and legally binding user signatures. This increases user confidence in the one-time-use electronic signatures produced by methods and systems herein, increasing their generalized use and acceptance.

Further, while the one-time-use electronic signature is described as an alphanumeric code or encryption stream, the one-time-use electronic signature can be converted other elements also, such as graphic elements including images, glyphs, barcodes, simulated handwriting, etc. As is understood, all graphic such items can be converted back into the alphanumeric code or encryption stream by reversing the process used to convert such to the graphic item. Therefore, the data within the one-time-use electronic signature can be stored as, or converted, to bitmaps allowing the one-time-use electronic signatures to be visually represented on a display screen or printed on print media. Because the data within each one-time-use electronic signature is unique, each bitmap representation of such data is similarly unique. In item 180, the provider processes the one-time-use electronic signature as a legally binding signature of the user making the request through the app in item 150. For example, as shown in item 182, the provider can supply the one-time-use electronic signature (either as a code of digits, a bitmap, an image, etc.) to a party identified to receive the one-time-use electronic signature in the user request (which may be a different party from the one receiving the approval/denial of the request in items 158 and 170). For example, in item 182, the methods here can supply the one-time-use electronic signature to a financial institution as documentation of user agreement to financial transactions, or to a merchant to allow the merchant to retain proof of signature, etc. Additionally, or alternatively, as shown in item 184 the provider can store the one-time-use electronic signature in a signature repository (e.g., electronic storage, such as a computer server, etc.) through the computer network. Such a signature repository can be that of the provider's or can be that of the financial institution, the merchant, etc.

In other alternatives, in item 186, the provider can add the one-time-use electronic signature to legal documents that have been requested to be signed in the user request. This allows the provider to supply signed legal documents (containing the one-time-use electronic signature) in item 188 to a party requesting the signed legal documents in the user request.

Thus, in one example, if a user is purchasing an item for which the user signature is required on legal documents such as a legal title or loan documents (e.g., purchasing a house, a car, etc.) not only can the request approval (output in item 170) cause a financial institution to make payment to a seller of such an item, item 186 permits the methods herein to produce an executed title, executed loan documentation, etc., to complete such a transaction by placing a legally binding user signature on the title or other documentation, which avoids the inconvenience of having the user physically sign the documents (the one-time-use electronic signature is placed on the legally binding documents instead of (in place of) the user's physical signature and the one-time-use electronic signature is the only signature ever placed on the documents). This is especially useful if the one-time-use electronic signature is maintained in a bitmap format that can resemble human handwriting, because the dark and light marks from the bitmap can be added to the legal document to execute the legal document with the same effect as if the user had hand-signed the legal document. Further, such is consistent with physical human document signing (which is inconsistent from physical signature to physical signature) because the uniqueness of each bitmap that is altered by, or based on, the one-time-use electronic signature renders each bitmap representation of the one-time-use electronic signature visually unique, in the same way that each different human signature is visually unique.

Figure 3:
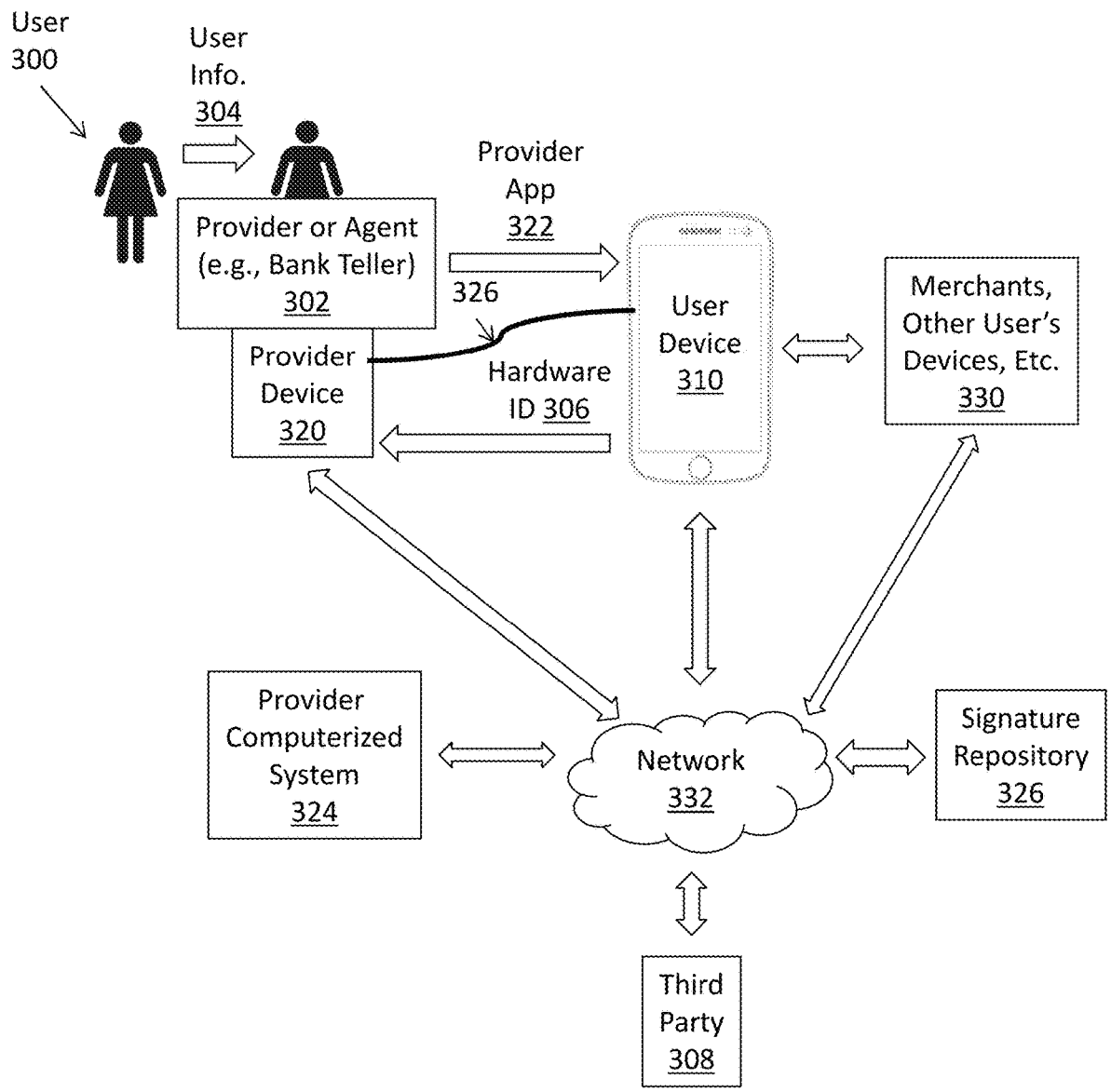
FIG. 3 is a schematic diagram illustrating systems herein.

FIG. 3 illustrates some aspects of a non-limiting example of systems herein that include (among other components) a provider device 320, a provider app 322, and a provider computerized system 324 that is operatively connected to the provider device 320 through a computerized network 332. As shown in FIG. 3, in order to verify the identity of the user 300, the provider/agent 302 obtains what is referred to herein as physically supplied user information 304 of the user 300. As noted above, a human representative of the provider/agent 302 can obtain a government issued identification and a signature from the user 300 when physically meeting with the user 300. For example, a bank employee can check the driver's license, passport, etc., of a new or existing customer and have the customer provide an authorized signature (or such could have been done historically and maintained by the bank in a repository of signature cards).

The provider device 320 is operated by the provider/agent 302 and used by the provider/agent 302 to input the physically supplied user information 304 by scanning and/or manual input (e.g., keystrokes, menu selections, etc.). Such physically supplied user information is transmitted from the provider device 320 to the provider computerized system 324 where it is stored for future use.

The user 300 possesses one or more user devices 310 that are considered herein to be "associated with" the user 300 because such devices 310 are in the user's 300 possession. After the identity of the user 300 is verified by the provider/agent 302, the provider/agent 302 potentially verifies the user device 310 and supplies the provider app 322 to the user device(s) 310.

Either at the same time that the user's 300 identity is verified or at a later time, the initially obtained hardware identifiers 306 of the user device 310 are obtained. For example, in one option, the provider/agent 302 (when physically or virtually meeting with the user 300) can connect the provider device 320 to the one or more user-supplied devices 310. In other examples, the provider computerized system 324 can connect to the user device(s) remotely through the computerized network 332 to read the initially obtained hardware identifiers, or the initially obtained hardware identifiers can be obtained by the provider app 322 during the installation of the provider's app 322 on the user device 310.

Figure 4:
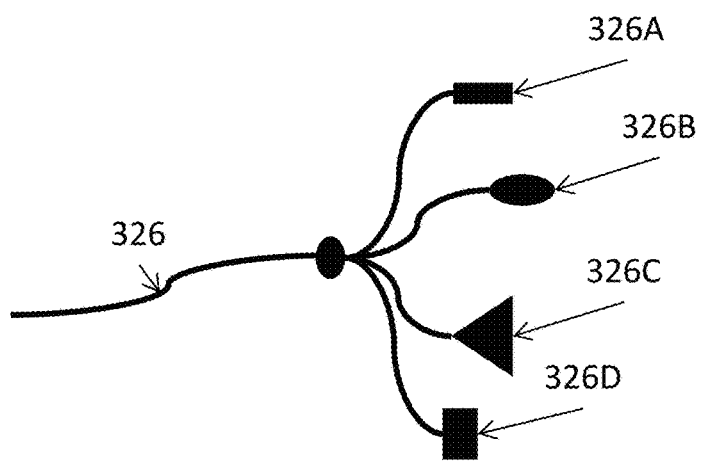
FIG. 4 is a schematic diagram illustrating connector devices herein.

Thus, in one example the provider device 320 can include a physical attachment 326 for connecting to the user device 310. Details of the physical attachment 326 are shown in FIG. 4. More specifically, the physical attachment can include a number of different style connectors 326A-326D each of which is shaped, sized, etc., to form a proper communications connection with a different type of user device 310.

If the provider device 320 is connected to the user device 310 through such a physical attachment 326, the provider device 320 is adapted to obtain the initially obtained hardware identifiers 306 of the user device 310. Again, the provider device 320 is connected to the user device 310 only after the provider/agent 302 has verified the identity of user 300 using the physically supplied user information 304. The provider device 320 transmits the physically supplied user information 304, and potentially the initially obtained hardware identifiers 306 of the user device 310, to the provider computerized system 324 through the network 332.

After at least verifying the identity of the user, the provider/agent 302 physically supplies the provider app 322 to the device 310. For example, the provider device 320 (after obtaining the initially obtained hardware identifiers 306) can supply the provider app 322 while still physically connected to the user device 310 through the physical attachment 326. In other alternatives, the provider/agent 302 can supply an electronic storage media device (e.g., disk, memory stick, etc.) to the user 300 to allow the user 300 to install the provider app 322 on the user device 310, or the provider app 322 can be remotely downloaded to the user device 310 through the computerized network 332, etc. Any electronic storage media devices containing the provider app 322 supplied to users can be one-time-use devices that automatically delete the provider app 322 at the very first use instance (e.g., when the provider app 322 is supplied to a device) and this prevents unauthorized copies of the provider app 322 from being supplied to other devices because the app can be taken from the electronic storage media device one time (after which it is automatically deleted). One feature of methods and systems herein is that the distribution of the provider app 322 is physically restricted to users 300 whose identity has been verified and who have potentially supplied approved devices 310.

Therefore, the methods and systems herein install the provider app 322 on the user device 310. During such installation, the initially obtained hardware identifiers 306 can be obtained from the user device 310, if they have not been previously obtained by the provider device 320. If the initially obtained hardware identifiers 306 are obtained during installation by the provider app 322, the initially obtained hardware identifiers 306 are transmitted by the provider application 322 to the provider computerized system 324 through the computerized network 332, at which point the provider computerized system 324 either approves or disapproves the user device 310 (using the criteria described above). If the user device 310 is approved, installation continues; however, if the user device 310 is disapproved, installation terminates and the provider app 322 can be adapted to automatically delete itself from the user device 310.

The provider app 322 is adapted to (if, and when, installed on the user device 310) obtain read hardware identifiers of the user device 310 and obtain entered user information through a user interface of the user device 310. The provider app 322 automatically encrypts and stores the read hardware identifiers and the entered user information as what is referred to herein as "encrypted data" in the electronic memory of the user device 310. Each different provider app 322 that is supplied to each different user device 310 contains a different encryption key for such encryption. The provider app 322 automatically transmits (or causes the user device 310 to transmit) the encrypted data to the provider computerized system 324 through the computer network 332, etc.

As an additional safeguard to prevent inappropriate or unauthorized use of the provider app 322, the provider computerized system 324 is adapted to evaluate the encrypted data and allow or deny use of the provider app 322 on the user device 310. For example, the provider computerized system 324 is adapted to evaluate the encrypted data by at least decrypting the encrypted data as decrypted data using a key consistent with the encryption methodology used by the provider app 322, determining whether the read hardware identifiers in the decrypted data match the initially obtained hardware identifiers 306, and determining whether the entered user information in the decrypted data match the physically supplied user information 304.

After use of the provider app 322 on the user device 310 has been allowed by the provider computerized system 324, the provider app 322 is adapted to receive a user request from the user 300 through the user interface of the user device 310. The provider app 322 is further adapted to automatically generate a modified request containing data from the user request and the encrypted data and forward the modified request to the provider computerized system 324 through the computer network 332.

In response, the provider computerized system 324 is adapted to approve or disapprove the modified request based, in part, on whether data in the modified request matches the initially obtained hardware identifiers 306 and the physically supplied user information 304. The provider computerized system 324 is adapted to supply such approval or disapproval of the modified request through the computer network 332 to a third party 308 responsible for satisfying the user request.

Additionally, the provider computerized system 324 is adapted to generate a one-time-use electronic signature using data from a sequencer, data from the encrypted data, and data from the modified request, upon the approval of the modified request. In some implementations, the provider computerized system 324 and the provider app 322 are adapted to sequence separate sequencers at the same increment for each different user request. Further, the provider computerized system 324 is adapted to supply the one-time-use electronic signature to a signature repository 326 through the computer network 332.

As described above, the one-time-use electronic signatures disclosed herein contain encoded data related to agreement(s) to which the signer is consenting, and some one-time-use electronic signatures will contain more encoded data than others, depending upon the type of agreement (e.g., agreement to remove a small amount of funds from a bank account vs. agreement to a transaction to purchase a piece of property). Usefully, the user (person signing ("signer")) does not need to supply the data that is encoded into the one-time-use electronic signature because the provider (e.g., bank or other financial institution, etc.) already has such data.

Figure 5:
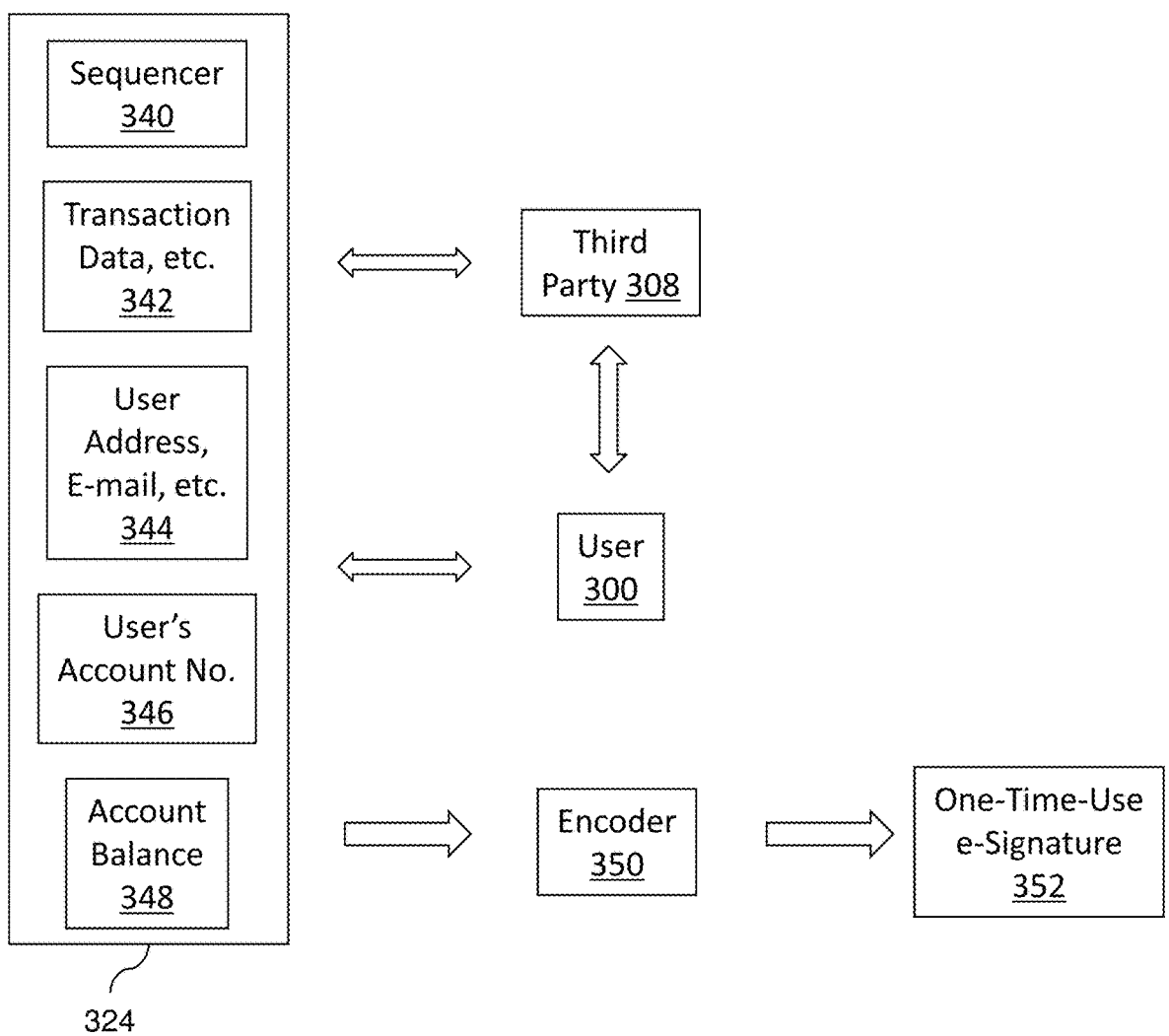
FIGS. 5 and 6 are schematic diagrams illustrating systems herein.

For example, this is shown in FIG. 5 where the provider computerized system 324 communicates with third parties 308 and the user 300 to obtain and maintain information that includes data relating to a specific transaction 342 (e.g., deposit/withdrawal amount, transaction details, time/date stamp, etc.), the user's name, address, e-mail, social security number, etc., 344, the user's account number(s) 346 or other similar account information, the user's account balance(s) 348, etc. This data (342-348) along with data from the provider sequencer 340 is encoded by an encoder 350 to generate the one-time-use electronic signature 352. In one example, the encoder 350 can apply a cipher to all, or a portion, of such data (340-348), can apply a translator to all, or a portion, of such data (340-348), can apply other known methodologies to all, or a portion, of such data (340-348) to generate a numeric or alpha-numeric string that is the one-time-use electronic signature 352.

Therefore, with the provider computerized system 324 creating the one-time-use electronic signatures 352, not only are such more secure than conventional e-signatures, the burden placed on the signer (user 300) is substantially less than with conventional systems for e-signature creation because the user 300 just submits a request to the provider computerized system 324, and the provider computerized system 324 takes care of all other details of creation of the one-time-use electronic signatures 352.

In one example, the provider computerized system 324 is adapted to add the one-time-use electronic signature to legal documents requested to be signed by the user request and supply the legal documents containing the one-time-use electronic signature to a third party 308 identified to receive the legal documents in the user request. One implementation of this processing is shown in FIGS. 6-7.

Figure 6:
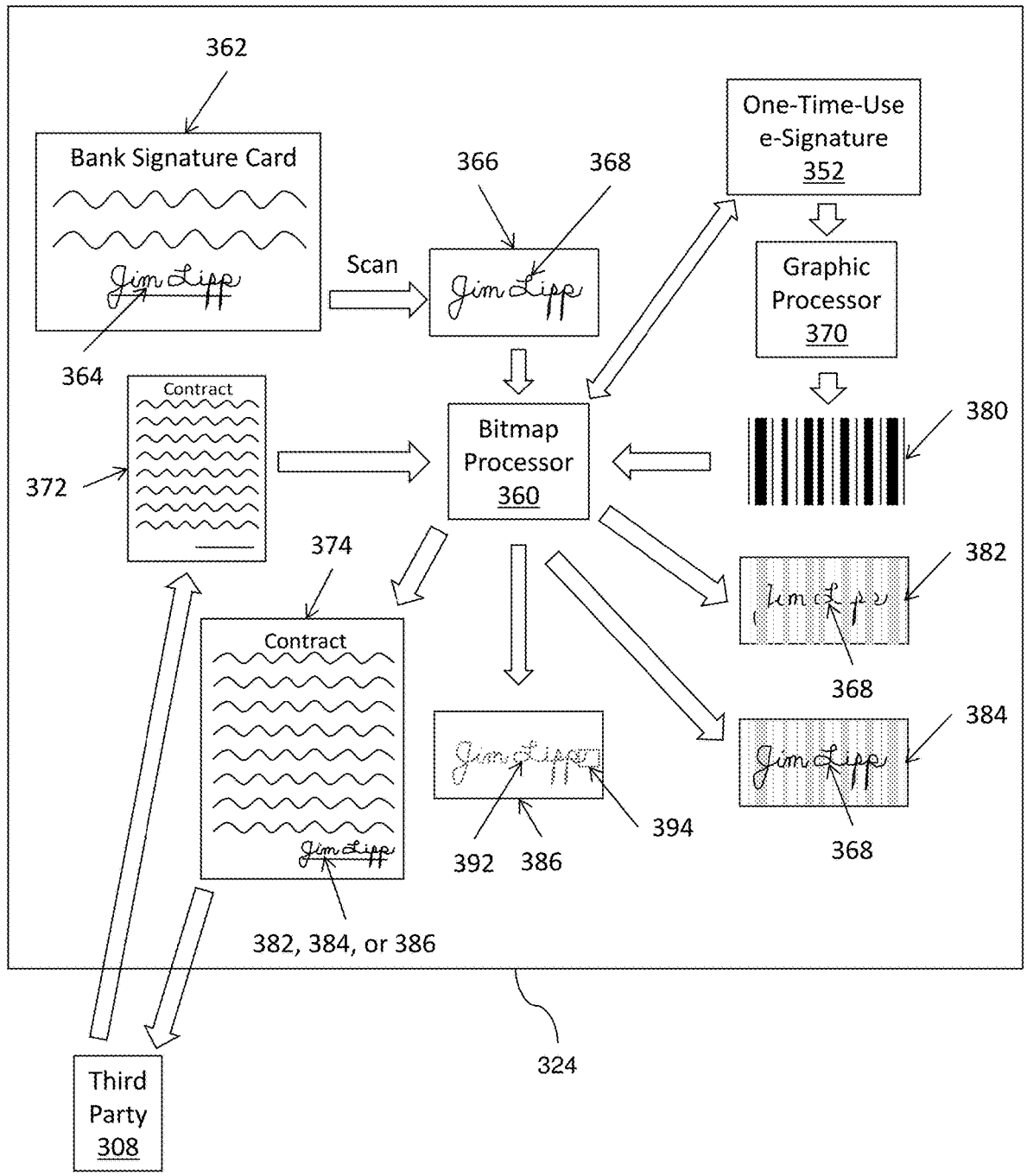
Figure 7:
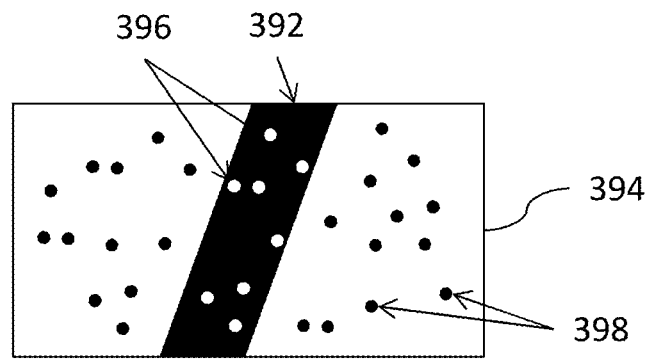
FIG. 7 is an expanded illustration of a portion of the system shown in FIG. 6.

More specifically, as shown in FIG. 6 processing performed by the provider computerized system 324 can begin with an initial bitmap scan 366 of an actual user signature 364, which is a physical item maintained, for example, on a bank signature card 362 and physically obtained from the user after the user has been properly identified/verified by a provider agent (e.g., see item 100 in FIG. 1). The initial bitmap 366, which is an electronic item, contains original strokes 368 (which are relatively darker pixels in locations where pen marks appear in the physical (actual) user signature 364).

A bitmap processor 360 alters the initial bitmap 366 using a pixel modification scheme that applies the numeric values in the one-time-use electronic signature 352 to the initial bitmap 366 to change pixels of the initial bitmap 366 and thereby create an altered bitmap 386 that specifically corresponds to data within a specific one-time-use electronic signature 352.

For example, the bitmap processor 360 can adjust the dark/light pixels of the initial bitmap 366 to change the thickness, height, darkness, etc., of some of the original strokes 368 of the initial bitmap 366. This changes the original strokes 368 into altered strokes 392 (lines) of the altered bitmap 386. In some examples, the bitmap processor 360 can lengthen/shorten portions of the original strokes 368, omit some portions of the original strokes 368, include stray marks around the original strokes 368, add light areas (white pixels) to original strokes 368, etc., in order to generate the altered strokes 392.

For example, FIG. 7 provides an expanded view of area 394 in FIG. 6 and shows a portion of an altered stroke 392 that includes altered pixels 396, 398. Here, pixels 396 have been changed from dark to light in locations where the original strokes 368 were an unbroken, solid dark color in the initial bitmap 366, in order for the bitmap processor 360 to generate the altered stroke 392. Similarly, pixels 398 have been changed from light to dark in locations where initial bitmap 366 contained an unbroken, solid light color area to add stray marks around the original strokes 368. The pattern of changed pixels 396, 398 contains the data of the one-time-use electronic signature 352. One or both of such techniques can be included in a single altered bitmap 386. Thus, with such methods, specific values within the one-time-use electronic signature cause changes in specific pixels in the initial bitmap in the same way a barcode or glyph represents the underlying data.

FIG. 6 also illustrates that a graphic processor 370 (which may be separate or combined with the bitmap processor 360) can create a graphic item 380, such as a barcode, glyph, etc., by converting the alpha-numeric values of the one-time-use electronic signature 352 into graphic elements. This graphic item 380 can be added to documents or other items, or the graphic item 380 alone can be supplied to third parties. Alternatively, or additionally, a watermark containing the graphic item 380 (glyph, barcode, etc.) can be added in front of (382) or behind (384) the original strokes 368 of the initial bitmap 366 to generate alternative forms of altered bitmaps that correspond to the data within the one-time-use electronic signature 352. Thus, FIG. 6 illustrates a lighter (gray) barcode watermark added in front of (382) or behind (384) the original strokes 368 of the initial bitmap 366.

As noted above, such altered bitmaps 382, 384, 386 containing graphic forms of the one-time-use electronic signature 352 can be added to legal (or other) documents 372 which may be supplied to the provider computerized system 324 by third parties 308. This can produce a user-signed document 374 containing a legally-binding signature 382, 384, or 386, which can be automatically output and supplied to one or more third parties 308 by the provider computerized system 324, making the execution of legally binding documents much easier and more convenient for users.

The locations and colors of the changed pixels, relative to pixels in the initial bitmap 366, represent the data of the one-time-use electronic signature 352, allowing the altered bitmap 386 to be converted back into the one-time-use electronic signature 352 by the bitmap processor 360. In other words, any altered bitmap described herein (for example, 382, 384, or 386) or any document (374) containing such an item (382, 384, or 386) can be supplied to the bitmap processor 360, and without any other inputs, the bitmap processor 360 can generate the one-time-use electronic signature 352 used to create such an altered bitmap simply by reversing the process used to create the altered bitmap. Further, all details of the transaction (e.g., items 342-348 in FIG. 5) can be generated from any one-time-use electronic signature 352 by the provider computerized system 324 simply by reversing the process used to create the one-time-use electronic signature 352. Therefore, the provider computerized system 324 can generate (or regenerate) all details of a corresponding transaction after being supplied just the altered bitmap (342-348).

Figure 8:
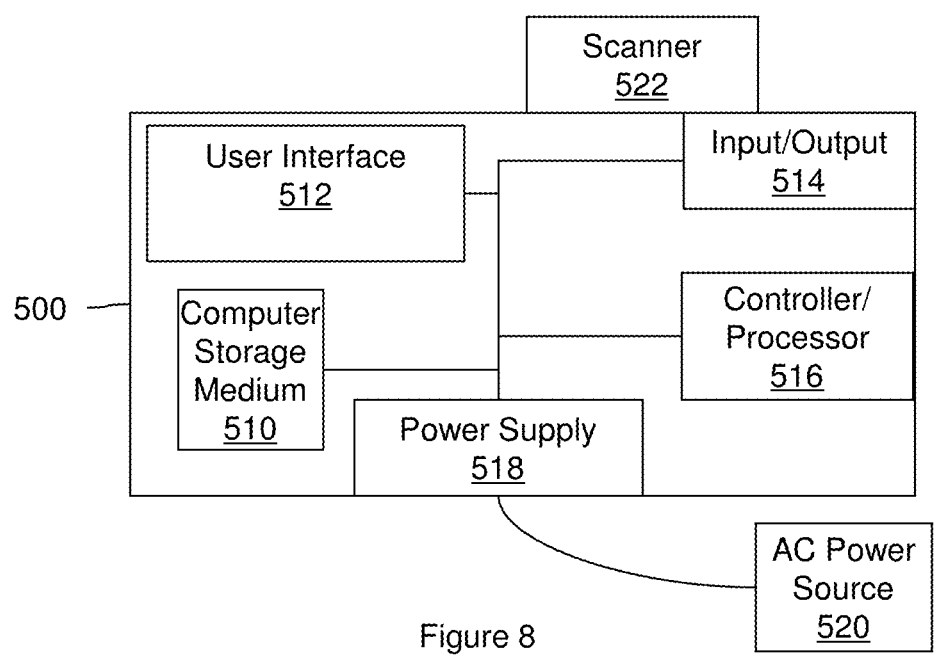
FIG. 8 is a schematic diagram illustrating computerized devices herein.

FIG. 8 illustrates some details of a computerized device 500, which can be used with systems and methods herein; and FIG. 8 illustrates some of the components of any of the devices previously described, including the user device 310, the provider device 320, a computer within the provider computerized system 324, other devices 330, a computer within the computerized network 332, etc. Therefore, the computerized device 500 can comprise, for example, a server, a personal computer, a portable computing device, a special-purpose device (e.g., provider device 320), etc.

The computerized device 500 includes a controller/tangible processor 516 and a communications port (input/output) 514 operatively connected to the tangible processor 516 and to the computerized network 332 external to the computerized device 500. Also, the computerized device 500 can include at least one user interface (UI) assembly 512, which can include a screen or display, an input surface such as a touchpad or keyboard, etc. The user may receive messages, instructions, and menu options from, and enter instructions through, the user interface or control panel 512. A scanner 522 can be included as a component of the computerized device 500 to optically scan items such as the physically supplied user information, etc.

The input/output device 514 is used for communications to and from the computerized device 500 and comprises a wired device or wireless device (of any form, whether currently known or developed in the future). The tangible processor 516 controls the various actions of the computerized device. A non-transitory, tangible, computer storage medium device 510 (which can be optical, magnetic, capacitor based, etc., and is different from a transitory signal) is readable by the tangible processor 516 and stores instructions that the tangible processor 516 executes to allow the computerized device to perform its various functions, such as those described herein. Thus, as shown in FIG. 8, a body housing has one or more functional components that operate on power supplied from an alternating current (AC) source 520 by the power supply 518. The power supply 518 can comprise a common power conversion unit, power storage element (e.g., a battery, etc.), etc.

The hardware described herein plays a significant part in permitting the foregoing method to be performed, rather than function solely as a mechanism for permitting a solution to be achieved more quickly, (i.e., through the utilization of a computer for performing calculations). Specifically, the above-described computerized hardware is required to allow the provider app to operate on the user device, to allow the provider app to read hardware identifiers of the user device, to allow the app to communicate with the provider computerized system through the network. Similarly, such hardware plays a significant part in restricting the creation of electronic signatures to the provider computerized system, such hardware allows the provider computerized system to generate the electronic signatures (which cannot be generated by humans alone), and such hardware is significant in the communications through the network performed by the provider computerized system.

As would be understood by one ordinarily skilled in the art, the processes described herein cannot be performed by a human alone (or one operating with a pen and a pad of paper) and instead such processes can only be performed by a machine (especially when the complexity of encryption, digital certificates, and electronic signatures is considered, and the speed at which such data needs to be evaluated is considered). For example, if one were to manually attempt to calculate a digital certificate or electronic signature by the methods and devices discussed herein, the manual process would be sufficiently inaccurate and take an excessive amount of time so as to render the manual results useless. Specifically, such processes require the utilization of different specialized machines, and humans performing such processing would not produce useful results because of the time lag, inconsistency, and inaccuracy humans would introduce into the results.

Further, processes such as electronic transmission of data over networks, creating/reading digital certificates, encryption processes using device, transaction, and user data, etc., requires the utilization of different specialized machines and such actions performed automatically cannot be performed manually (because it would take decades or lifetimes) and are integral with the processes performed by methods herein. Further, electronic signatures rely upon the confidence of the recipient that such an electronic signature is valid and binding, and electronic signatures produced by humans without machines would not produce the same level of confidence, destroying the value of the electronic signatures.

Further, such machine-only processes are not mere post-solution activity because the methods require the utilization of machines at each step, such as running the provider app, verifying hardware identifiers of components of the user device, creating and transmitting the electronic signature, etc., and such processing cannot be performed without machines. Also, the data transmissions are integral with the process performed by the methods herein to restrict creation of electronic signatures to the provider. Additionally, such data transmissions are not mere post-solution activity, because the methods herein rely upon the previous data receipt to perform the next processing step, and actions such as restricting creation of electronic signatures to the provider cannot be performed without such electronic transmissions. In other words, these various machines are integral with the methods herein because the methods cannot be performed without the machines (and cannot be performed by humans alone).

Additionally, the methods herein solve many highly complex technological problems. For example, as mentioned above, electronic signatures suffer from the technological problems of not being secure enough, or of being overly technically complex to create and use (if they do have strong security). Such technological problems place barriers in the way of using electronic signatures by reducing confidence that the electronic signature is valid (caused by the technological problem of low security electronic signatures) or making it very difficult to create higher security electronic signatures (caused by the technological problem of over-complexity of higher security electronic signatures).

Methods herein solve these technological problem by reducing the technical complexity of creating and using high-security electronic signature and by restricting creation/storage of such signatures to the provider. As explained above, the methods and systems herein reduce the number of in-person meetings between providers and their customers by using historically maintained identity verifications, reduce technological complexity by limiting user interaction to a request through an app, increase security with the electronic signature being generated and processed by the provider (after verifying that the app and user device are valid), etc. By changing the technology to create and process electronic signatures at the provider computerized system and including technology in the provider app that limits the user and the user device to making requests through the app, the revised technology of the methods and systems disclosed herein simplify the creation of the electronic signature for the user (reducing barriers to electronic signature creation) yet still output a high-security electronic signature (reducing barriers to acceptance of electronic signatures).

Also, as mentioned above, the methods and devices herein greatly simplify the operation from the user's viewpoint by reducing the number of interactions with the user interface (user interaction reduced to a user request), which decreases the amount of time needed to perform the operations described herein, etc. This, in turn, reduces the amount of time that the user interface is on (thereby saving power) and also reduces the load on all processing components (e.g., reduces load on the user interface equipment by avoiding a complicated user-created electronic signature operation, which in turn reduces load on the processor, by avoiding calculating the estimated dimensions, etc.). Thus, the methods herein reduce the amount and complexity of hardware and software needed to be purchased, installed, and maintained, by the user thereby solving a substantial technological problem that providers experience today.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    supplying, by a provider, an application to a device of a user after verifying an identity of the user, wherein the application, operating on the device:
        encrypts and stores device identifiers of the device and user information of the user as encrypted data in electronic memory of the device; and
        transmits the encrypted data to the provider through a computer network as initially obtained data;
    receiving, by the application, a user request through a user interface of the device;
    generating, by the application, a modified request containing data from the user request and the encrypted data;
    forwarding, by the application, the modified request to the provider through the computer network;
    supplying, by the provider, approval or disapproval of the user request through the computer network to a party responsible for satisfying the user request based, in part, on whether data in the modified request matches the initially obtained data maintained by the provider;
    generating, by the provider, a one-time-use electronic signature using data from a sequencer and data from the modified request, upon approval of the modified request; and
    adding, by the provider, the one-time-use electronic signature to documents requested to be signed by the user request.

2. The method according to claim 1, wherein the provider evaluates the encrypted data by at least:
    decrypting the encrypted data as decrypted data using a key consistent with an encryption method used by the application;
    determining whether the device identifiers in the decrypted data match initially obtained ones of the device identifiers; and
    determining whether the user information in the decrypted data match previously supplied ones of the user information.

3. The method according to claim 1, further comprising:
    supplying, by the provider, the documents containing the one-time-use electronic signature to a party identified to receive the legal documents in the user request.

4. The method according to claim 1, further comprising evaluating, by the provider, the device identifiers to approve or disapprove the device, wherein installation of the application on the device is limited to devices with approved device identifiers.

5. The method according to claim 1, wherein each of the application supplied to different devices contains a different encryption key used to encrypt the encrypted data.

6. The method according to claim 1, further comprising sequencing, by the provider and the application, separate sequencers at the same increment for each different user request.

7. The method according to claim 1, further comprising physically verifying an identity of the user, wherein the physically verifying comprises obtaining a government issued identification and a signature from the user.

8. A method comprising:
    connecting, by a provider agent, a user device of a user to a provider device;
    obtaining, by the provider device, device identifiers of the user device;
    evaluating, by the provider device, the device identifiers to approve or disapprove the user device,
    supplying, by the provider agent, an application to the user device after approving the user device, wherein the application, operating on the user device:
        encrypts and stores the device identifiers and user information as encrypted data in electronic memory of the user device; and
        transmits the encrypted data to the provider device through a computer network as initially obtained data;
    receiving, by the application, a user request through a user interface of the user device after use of the application on the user device is allowed;
    generating, by the application, a modified request containing data from the user request and the encrypted data;
    forwarding, by the application, the modified request to the provider device through the computer network;
    supplying, by the provider device, approval or disapproval of the user request through the computer network to a party responsible for satisfying the user request based, in part, on whether data in the modified request matches the initially obtained data maintained by the provider device;
    generating, by the provider device, a one-time-use electronic signature using data from a sequencer and data from the modified request, upon approval of the modified request; and
    adding, by the provider, the one-time-use electronic signature to legal documents requested to be signed by the user request.

9. The method according to claim 8, wherein the provider device evaluates the encrypted data by at least:

decrypting the encrypted data as decrypted data using a key consistent with an encryption method used by the application;

determining whether the device identifiers in the decrypted data match initially obtained ones of the device identifiers; and determining whether the user information in the decrypted data match physically supplied ones of the user information.

10. The method according to claim 8, further comprising:

supplying, by the provider device, the legal documents containing the one-time-use electronic signature to a party identified to receive the legal documents in the user request.

11. The method according to claim 8, wherein installation of the application on the user device is limited to devices with approved device identifiers.

12. The method according to claim 8, wherein each of the application supplied to different devices contains a different encryption key used to encrypt the encrypted data.

13. The method according to claim 8, further comprising sequencing, by the provider device and the application, separate sequencers at the same increment for each different user request.

14. The method according to claim 8, further comprising physically verifying an identity of the user, wherein the physically verifying comprises obtaining a government issued identification and a signature from the user.

15. A system comprising:

a provider device; and a provider computerized system operatively connected to the provider device through a computerized network; and an application in communication operatively connected to the provider computerized system through the computerized network, wherein the provider device is adapted to install the application on a user device, wherein the application is adapted to, when operating on the user device:

encrypt and store device identifiers of the user device and user information as encrypted data in electronic memory of the user device; and transmit the encrypted data to the provider computerized system through the computer network as initially obtained data, wherein the application is adapted to receive a user request from the user through a user interface of the user device after use of the application on the user device is allowed by the provider computerized system, wherein the application is adapted to generate a modified request containing data from the user request and the encrypted data, wherein the application is adapted to forward the modified request to the provider computerized system through the computer network, wherein the provider computerized system is adapted to supply approval or disapproval of the user request through the computer network to a party responsible for satisfying the user request based, in part, on whether data in the modified request matches the initially obtained data maintained by the provider computerized system, wherein the provider computerized system is adapted to generate a one-time-use electronic signature using data from a sequencer and data from the modified request, upon approval of the modified request, and wherein the provider computerized system is adapted to add the one-time-use electronic signature to legal documents requested to be signed by the user request.

16. The system according to claim 15, wherein the provider computerized system is adapted to evaluate the encrypted data by at least:

decrypting the encrypted data as decrypted data using a key consistent with an encryption methodology used by the application;

determining whether the device identifiers in the decrypted data match initially obtained ones of the device identifiers; and determining whether the user information in the decrypted data match physically supplied ones of the user information.

17. The system according to claim 15, wherein the provider computerized system is adapted to supply the documents containing the one-time-use electronic signature to a party identified to receive the legal documents in the user request.

18. The system according to claim 15, wherein the provider computerized system is adapted to evaluate the device identifiers to approve or disapprove the user device, and wherein the provider device is adapted to supply the application only to devices with approved device identifiers.

19. The system according to claim 15, wherein each application contains a different encryption key used to encrypt the encrypted data.

20. The system according to claim 15, wherein the provider computerized system and the application are adapted to sequence separate sequencers at the same increment for each different user request.

* * * * *